United States Patent
Finnerty et al.

(10) Patent No.: US 11,708,835 B2
(45) Date of Patent: Jul. 25, 2023

(54) AIR INTAKE ASSEMBLY FOR CENTRIFUGAL BLOWER SYSTEM AND FUEL CELL INCORPORATING SAME

(71) Applicant: Watt Fuel Cell Corp., Mt. Pleasant, PA (US)

(72) Inventors: Caine M. Finnerty, Mount Pleasant, PA (US); Paul Dewald, Scottdale, PA (US)

(73) Assignee: WATT Fuel Cell Corp., Mt. Pleasant, PA (US)

( * ) Notice: Subject to any disclaimer, the term of this patent is extended or adjusted under 35 U.S.C. 154(b) by 365 days.

(21) Appl. No.: 16/646,685

(22) PCT Filed: Sep. 12, 2018

(86) PCT No.: PCT/US2018/050593
§ 371 (c)(1),
(2) Date: Mar. 12, 2020

(87) PCT Pub. No.: WO2019/055472
PCT Pub. Date: Mar. 21, 2019

(65) Prior Publication Data
US 2020/0277961 A1 Sep. 3, 2020

Related U.S. Application Data

(60) Provisional application No. 62/558,005, filed on Sep. 13, 2017.

(51) Int. Cl.
*F04D 17/16* (2006.01)
*F04D 25/14* (2006.01)
(Continued)

(52) U.S. Cl.
CPC ............. *F04D 17/16* (2013.01); *F04D 25/14* (2013.01); *F04D 29/4213* (2013.01);
(Continued)

(58) Field of Classification Search
CPC ........ F04D 27/008; F04D 17/16; F04D 25/14; F04D 29/4213; H01M 8/04089; H01M 2008/1293
See application file for complete search history.

(56) References Cited

U.S. PATENT DOCUMENTS 4,917,572 A 4/1990 Van Houten
5,601,112 A 2/1997 Sekiya et al.
(Continued)

FOREIGN PATENT DOCUMENTS

CN 1853304 A 10/2006
CN 106784923 A 5/2017
(Continued)

OTHER PUBLICATIONS

Written Opinion and International Search Report dated Dec. 13, 2018.
Japanese Office Action dated Jun. 1, 2022.

*Primary Examiner* — Justin D Seabe
(74) *Attorney, Agent, or Firm* — Dilworth & Barrese, LLP.; Michael J. Musella, Esq.

(57) ABSTRACT

An air intake assembly for a centrifugal blower having a casing having an axial inlet and a radial outlet, an impeller disposed within the casing for drawing a gaseous medium at a first pressure into the axial inlet and expelling gaseous medium at a second higher pressure through the radial outlet, and a motor for driving the impeller, including an air intake assembly casing having an air inlet and an air outlet, the air outlet connectable to the axial inlet of the blower casing of the centrifugal blower, and a check valve mounted within the air intake assembly casing positioned to permit air flow from the air inlet through the air intake assembly casing to the air outlet and prevent air flow from the air outlet through the air intake assembly casing to the air inlet.

12 Claims, 9 Drawing Sheets

(51) Int. Cl.
    *H01M 8/04082*     (2016.01)
    *F04D 29/42*     (2006.01)
    *F04D 29/70*     (2006.01)
    *F16K 15/14*     (2006.01)
    *H01M 8/04089*     (2016.01)
    *H01M 8/12*     (2016.01)

(52) U.S. Cl.
    CPC .......... *F04D 29/703* (2013.01); *F16K 15/148* (2013.01); *H01M 8/04089* (2013.01); *H01M 8/04201* (2013.01); *H01M 2008/1293* (2013.01)

(56) References Cited

U.S. PATENT DOCUMENTS

| | | | |
|---|---|---|---|
| 5,839,879 A | 11/1998 | Kameoka et al. | |
| 6,174,232 B1 | 1/2001 | Stoll et al. | |
| 6,454,247 B2 | 9/2002 | Ujvari | |
| 6,497,971 B1* | 12/2002 | Reiser | H01M 8/04089 |
| | | | 429/432 |
| 6,525,935 B2 | 2/2003 | Casebolt | |
| 6,668,849 B2* | 12/2003 | Onstenk | F04D 25/14 |
| | | | 137/533.27 |
| 6,830,842 B2 | 12/2004 | Siepierski et al. | |
| 6,877,954 B2 | 4/2005 | Lin et al. | |
| 6,921,596 B2 | 7/2005 | Kelly et al. | |
| 7,061,758 B2 | 6/2006 | Liu et al. | |
| 7,184,265 B2 | 2/2007 | Kim et al. | |
| 7,314,679 B2* | 1/2008 | Hatsugai | H01M 8/0267 |
| | | | 429/513 |
| 7,351,031 B2 | 4/2008 | Horng et al. | |
| 7,744,341 B2 | 6/2010 | Hwang et al. | |
| 7,802,617 B2 | 9/2010 | Hwang et al. | |
| 7,864,525 B2 | 1/2011 | Chen et al. | |
| 7,883,813 B2* | 2/2011 | Lyle | H01M 8/04231 |
| | | | 429/459 |
| 7,885,068 B2 | 2/2011 | Seo et al. | |
| 7,887,290 B2 | 2/2011 | Chen et al. | |
| 7,891,942 B2 | 2/2011 | Hsu | |
| 7,902,617 B2 | 3/2011 | Baskaran | |
| 7,943,260 B2 | 5/2011 | Brighton et al. | |
| 7,948,750 B2 | 5/2011 | Hung et al. | |
| 9,017,893 B2 | 4/2015 | Dewald et al. | |
| 9,512,846 B2 | 12/2016 | Dewald et al. | |
| 9,593,686 B2 | 3/2017 | Dewald et al. | |
| 9,861,774 B2* | 1/2018 | Fu | A61M 16/1045 |
| 10,436,207 B2* | 10/2019 | Hustvedt | F04D 29/281 |
| 10,527,047 B2* | 1/2020 | Kamps | F04D 17/16 |
| 2003/0168103 A1 | 9/2003 | Onstenk et al. | |
| 2005/0026022 A1 | 2/2005 | Joos | |
| 2006/0051203 A1 | 3/2006 | Lee et al. | |
| 2006/0292426 A1* | 12/2006 | Stenersen | B01D 53/0431 |
| | | | 429/513 |
| 2008/0113228 A1 | 5/2008 | Whyatt et al. | |
| 2009/0023381 A1 | 1/2009 | Doherty | |
| 2010/0239936 A1 | 9/2010 | Park et al. | |
| 2012/0328969 A1 | 12/2012 | Dewald et al. | |
| 2014/0193734 A1* | 7/2014 | Ludwiszewski | H01M 8/04089 |
| | | | 429/513 |
| 2015/0194683 A1* | 7/2015 | DeWald | F04D 17/12 |
| | | | 429/428 |
| 2017/0110749 A1 | 4/2017 | Waller et al. | |

FOREIGN PATENT DOCUMENTS

| | | |
|---|---|---|
| EP | 2963725 A1 | 1/2016 |
| JP | 53145375 U | 11/1978 |
| JP | 08105557 A | 4/1996 |
| JP | 2009509733 A | 3/2009 |
| JP | 2010509734 A | 3/2010 |
| JP | 2014523503 A | 9/2014 |
| JP | 2016012531 A | 1/2016 |
| WO | 2016089912 A1 | 6/2016 |
| WO | 2016148681 A1 | 9/2016 |
| WO | 2019055472 A1 | 3/2019 |

\* cited by examiner

AIR INTAKE ASSEMBLY FOR CENTRIFUGAL BLOWER SYSTEM AND FUEL CELL INCORPORATING SAME

This application is a U.S. national stage of International Application No. PCT/US2018/050593, which was filed on Sep. 1, 2018, and which claims priority to U.S. Provisional Application No. 62/558,005 filed on Sep. 13, 2017, the entire contents of each of which are incorporated herein by reference.

BACKGROUND OF THE INVENTION

This invention relates to centrifugal blowers and to fuel cells incorporating same, and more particularly to an air intake assembly for centrifugal blowers.

Centrifugal blowers, or centrifugal fans, are a well-known type of device for providing a flow or movement of a gaseous medium. A common type of centrifugal blower includes a housing having an axially directed gas inlet and a radially directed gas outlet, an impeller disposed within the housing for drawing gas at a first pressure into the inlet and expelling gas at a second higher pressure through the outlet and a motor for driving, i.e., spinning, the impeller. Variations of this general type of centrifugal blower are disclosed in, e.g., U.S. Pat. Nos. 4,917,572; 5,839,879; 6,877,954; 7,061,758; 7,351,031; 7,887,290; 7,891,942, and, U.S. 2006/0051203, the entire contents of which are incorporated by reference herein.

Centrifugal blowers in single unit and multiple independent unit configurations have been disclosed as components of cooling systems for computers, servers and other heat-generating electrical and electronic devices and equipment. See, e.g., U.S. Pat. Nos. 6,525,935; 7,184,265; 7,744,341; 7,802,617; 7,864,525; 7,885,068; 7,948,750; 7,902,617; and, 7,885,068, the entire contents of which are incorporated by reference herein.

Centrifugal blowers of the general type referred to above have been disclosed as components of fuel cells, of both the polyelectrolyte membrane (PEM) and solid oxide fuel cell (SOFC) types, and chemical reformers, where they function in one or more capacities, e.g., providing a flow of an oxidizer-containing gas such as air to the cathode elements of the fuel cell assembly and/or a flow of gaseous or vaporized fuel to its anode elements, recycling unspent fuel to the anode elements of the fuel cell assembly, providing a stream of cool air for cooling the fuel cell assembly or providing a stream of hot gas for vaporizing a liquid fuel prior to the external or internal reforming of the fuel to provide hydrogen for the operation of the fuel cell assembly. Fuel cell-blower assemblies featuring one or more centrifugal blowers are described in, e.g., U.S. Pat. Nos. 6,497,971; 6,830,842; 7,314,679 and 7,943,260, the entire contents of which are incorporated by reference herein.

During normal operations, fuel cell assemblies heat to temperatures ranging from 350° C. up to and exceeding 900° C. The components of the fuel cell assemblies are designed to maintain their mechanical, chemical, and/or electrical integrity during start up and normal operating modes. During a cool-down period, whether transitioning into a low power mode or power down procedure, problems can arise. For example, when the system is cooling down, the air inside a fuel cell assembly can condense and create a vacuum in the fuel cell assembly that would continue to draw outside air through an air inlet, or could also draw exhaust and possibly outside air back through the exhaust of the fuel cell assembly. The exposure of the fuel cell assembly to this additional air or exhaust can result in damaging oxidation of the fuel cell stack.

Many fuel cell assemblies and reformers utilize ambient air as a source of oxygen for the electrical and chemical reactions occurring therein as well as for temperature control within the units. Ambient air usually includes particulates (e.g., dirt/dust), contaminants (e.g. sulfur, hydrocarbons), and/or moisture, each of which can damage the fuel cell and reformer units.

SUMMARY OF THE INVENTION

In accordance with the present invention, there is provided a centrifugal blower air intake apparatus comprising: a blower unit, comprising: a blower casing having an axial inlet and a radial outlet; an impeller disposed within the casing for drawing a gaseous medium at a first pressure into the axial inlet and expelling gaseous medium at a second higher pressure through the radial outlet; and a motor for driving the impeller; and an air intake assembly, comprising: an air intake assembly casing having an air inlet and an air outlet, the air outlet connected to the axial inlet of the blower casing of the blower unit; and a check valve mounted within the casing positioned to permit air flow from the air inlet through to the air outlet and prevent air flow from the air outlet through to the air inlet.

Further in accordance with the present invention there is provided an air intake assembly for a centrifugal blower system comprising: a series of blower units, each blower unit in the series comprising a blower unit casing having an axial inlet and a radial outlet, an impeller disposed within the blower unit casing for drawing a gaseous medium at a first pressure into the axial inlet and expelling gaseous medium at a second higher pressure through the radial outlet, and a motor for driving the impeller; a duct connecting the radial outlet of at least one blower unit in the series of blower units with the axial inlet of at least one other blower unit in the series of blower units; and an air intake assembly, comprising an air intake assembly casing having an air inlet and an air outlet, the air outlet connectable to the axial inlet of the blower unit casing of a first blower unit of the series of blower units, and a check valve mounted within the air intake assembly casing positioned to permit air flow from the air inlet through to the air outlet and prevent air flow from the air outlet through to the air inlet.

Further in accordance with the present invention there is provided an air intake assembly for a centrifugal blower having a casing having an axial inlet and a radial outlet, an impeller disposed within the casing for drawing a gaseous medium at a first pressure into the axial inlet and expelling gaseous medium at a second higher pressure through the radial outlet, and a motor for driving the impeller, comprising: an air intake assembly casing having an air inlet and an air outlet, the air outlet connectable to the axial inlet of the blower casing of the centrifugal blower, a check valve mounted within the air intake assembly casing positioned to permit air flow from the air inlet through the air intake assembly casing to the air outlet and prevent air flow from the air outlet through the air intake assembly casing to the air inlet.

The air intake assembly for the centrifugal blower system herein offers several advantages prior art centrifugal blowers, particularly when incorporated in a fuel cell or fuel reformer for managing the flow of gaseous media therein.

Filtration of the incoming air before the check valve can be used to filter particulates, volatile compounds, potentially sulfur compounds from environment, desiccant to reduce moisture.

Filtration of the incoming air after the check valve can be used to filter particulates, volatile compounds, potentially sulfur compounds from environment, desiccant to reduce moisture.

The check valve prevents zero flow conditions from getting back flow from fans and other process air. At high temperatures, this can damage the solid oxide fuel cell (SOFC) and catalysts by oxidation. The present invention can prevent this from occurring.

The filter can be reticulated foam (low pressure drops) of some kind and potentially doped with specific materials to perform the tasks enumerated above.

The check valve can be a soft elastomer that induces very little pressure drop to open and uses the slight inherent stiffness and spring constant of the material to close and seal.

Utilizing the multiple blower system of this invention for meeting the gas flow requirements of a fuel cell enables the system to benefit from both low inertia impellers for control as well as low drive motor rpm and power draw to provide required gas flow and pressure.

Thus, in its integrated, or interconnected, arrangement of multiple centrifugal blowers inherently possessing smaller inertial forces than a single centrifugal blower of comparable gas flow capability, the centrifugal blower system herein provides improved response times and control over a broad range of gas pressure and gas flow requirements than that of a single centrifugal blower unit. Fuel cell-blower assemblies featuring this arrangement of multiple centrifugal blowers are described in, e.g., U.S. Pat. Nos. 9,017,893; 9,593,686 and 9,512,846, the entire contents of each of which are incorporated by reference herein.

Additional fuel cell-blower assemblies featuring this arrangement of multiple centrifugal blowers are described in, e.g., International Application No. PCT/US2015/020707, filed Mar. 16, 2015, and International Publication No. WO/2016/148681, published Sep. 22, 2016, the entire contents of each of which are incorporated by reference herein.

These and other novel features and advantages of this invention will become more apparent from the following detailed description and accompanying drawings.

BRIEF DESCRIPTION OF THE DRAWINGS

FIGS. 11A and 11B illustrate, respectively, perspective and plan views of a planar SOFC assembly possessing separate dual blower systems having an air intake assembly according to the present disclosure of the invention for providing, respectively, air and fuel flow to the assembly; and, FIG. 11C is a diagrammatic illustration of a cross section of an individual planar fuel cell in the planar SOFC assembly of FIGS. 11A and 11B.

DETAILED DESCRIPTION OF THE INVENTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

As discussed above, many fuel cell assemblies and/or reformers utilize ambient air as a source of oxygen for the electrical and chemical reactions occurring therein. The ambient air is also utilized to maintain proper operating temperatures in the fuel cell assemblies and/or reformers.

Ambient air includes particulates, contaminants, and/or moisture that can affect the proper operation of the fuel cell assemblies and/or reformers. These particulates, for dust or dirt, contaminants, for example sulfur or hydrocarbons, and/or moisture, can damage the fuel cell and reformer units. This damage can be in the form of oxidation to the internal components, hot spots from accumulating particulates, or rapid cooling that can cause structural defects in the components, among others.

The components of the fuel cell assemblies are designed to maintain their mechanical, chemical, and/or electrical integrity during start up and normal operating modes as exposed to the high operating temperatures. During cooldown periods, e.g., transitioning into a low power mode or power down procedure, problems can arise.

For example, when the system is cooling down, the air inside a fuel cell assembly can condense and create a vacuum in the fuel cell assembly that can continue to draw outside air in through an air inlet and/or exhaust. The exposure of the fuel cell assembly to this additional outside air can result in damaging oxidation or structural integrity of the fuel cell stack.

Figure 1A:
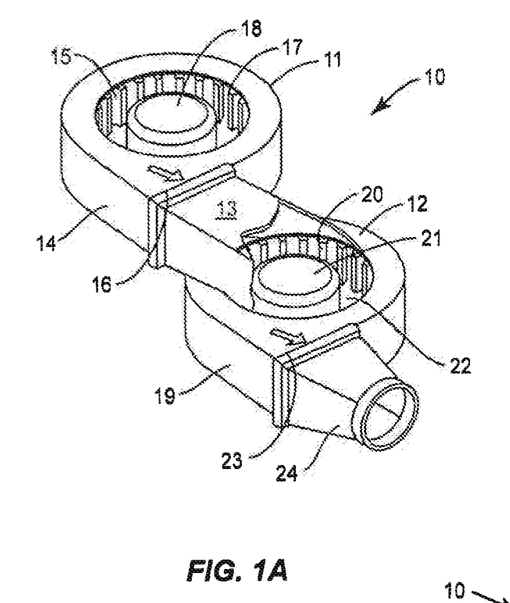
FIG. 1A illustrates a perspective view of a dual blower system with a section of the duct cutaway to show a portion of the inlet and impeller of the second blower unit to which the air intake assembly according to the present disclosure can be applied.
Figure 1B:
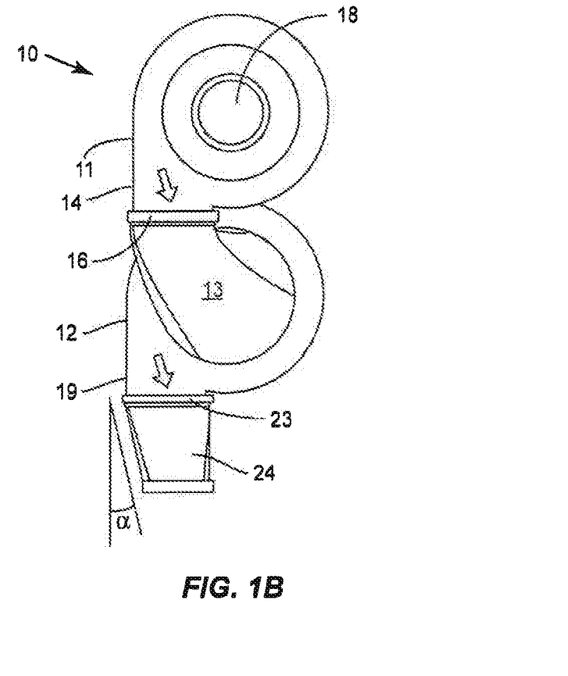
FIG. 1B illustrates a plan view of the dual blower system of 1A to which the air intake assembly according to the present disclosure can be applied.
Figure 2:
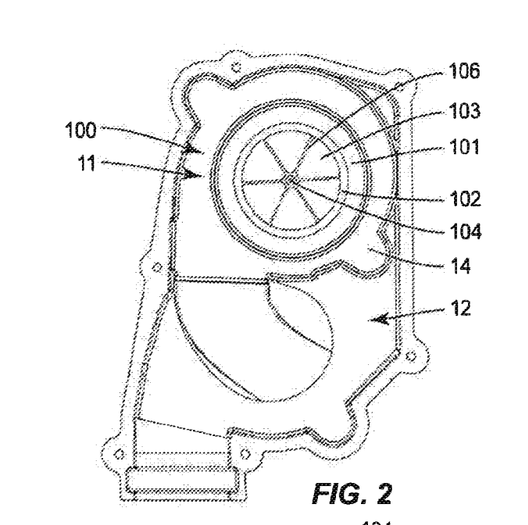
FIG. 2 is a top plan view of the air intake assembly according to the present disclosure connected to the dual blower system.
Figure 3:
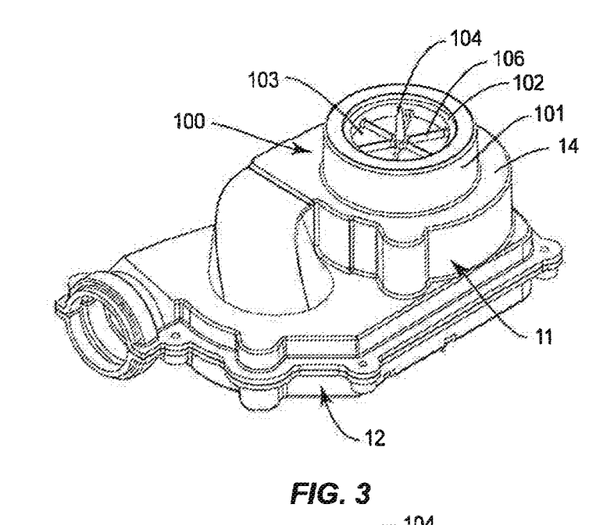
FIG. 3 is a perspective view of the air intake assembly according to the present disclosure connected to the dual blower system.
Figure 4:
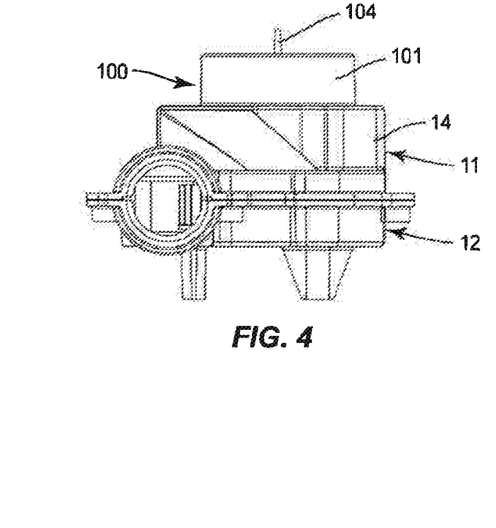
FIG. 4 is a front plan view of the air intake assembly according to the present disclosure connected to the dual blower system.
Figure 5:
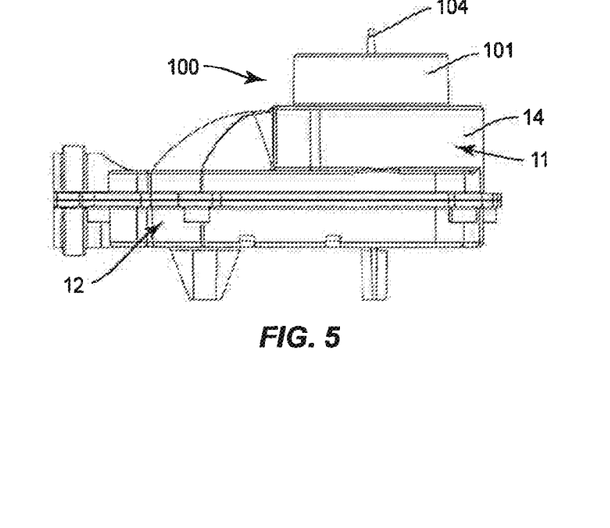
FIG. 5 is a side plan view of the air intake assembly according to the present disclosure connected to the dual blower system.

Referring to FIGS. 1A and B, in one embodiment, a centrifugal blower system is described to which the air intake assembly according to the present disclosure can be applied. Dual centrifugal blower system 10 includes a first centrifugal blower unit 11 connected to a second centrifugal blower unit 12 through duct 13. First blower unit 11 includes a blower casing 14 having an axial inlet 15 and a radial outlet 16, an impeller 17 disposed within blower casing 14 for drawing a gaseous medium at a first pressure into axial inlet 15 and expelling gaseous medium at a second higher pressure through radial outlet 16 and an electric motor 18 for driving impeller 17. Second blower unit 12 includes a casing 19 and, as shown by the cutaway section of duct 13 in FIG. 1A, an impeller 20 disposed within casing 19 and driven by electrical motor 21 and an axial inlet 22 for receiving gas medium discharged from outlet 16 of first blower unit 11. Second blower unit further includes a radial outlet 23 and outlet gas stream housing 24.

The arrows in FIGS. 1A and 1B and in the other embodiments of the invention illustrated in other figures herein indicate the general direction of the gas stream through the air intake assembly and blower units in the series of blower units. As shown, e.g., in FIG. 1B, the trajectory of the gas stream expelled through outlet 16 of first blower unit 11 and the trajectory of the gas stream expelled through outlet 23 of second blower unit 12 are not parallel to their respective outlets but are at some angle thereto. By arranging the geometry of duct 13 to receive the gas stream discharged through outlet 16 in such a manner that the stream remains approximately parallel to the interior walls of the duct, it is possible to prevent or reduce the turbulence that would otherwise occur were the stream to impinge upon these walls. Turbulence is advantageously minimized or avoided so as to reduce or eliminate it as a source of back pressure in the blower system. For this same reason, it is advantageous to arrange the angle of gas stream housing 24 so that its interior walls will be approximately parallel to the trajectory of the gas stream discharged through outlet 23 of second blower unit 12.

FIGS. 2-5 illustrate dual centrifugal blower system 10 with air intake assemble 100 attached to axial inlet 15. Air intake assembly includes an air intake casing 101 mountable to blower casing 14. The drawings illustrate air intake casing 101 and blower casing 14 formed as a monolithic component. Although illustrated in this way, air intake casing 101 can be a separate unit from blower casing 14, which in turn are configured with means to attach air intake casing 101 to blower casing 14. This attachment can include screws, nuts and bolts, a formed key and slot assembly, a slot and tab assembly, a twist locking tab and groove assembly, etc., to secure air intake casing 101 to blower casing 14.

Figure 6:
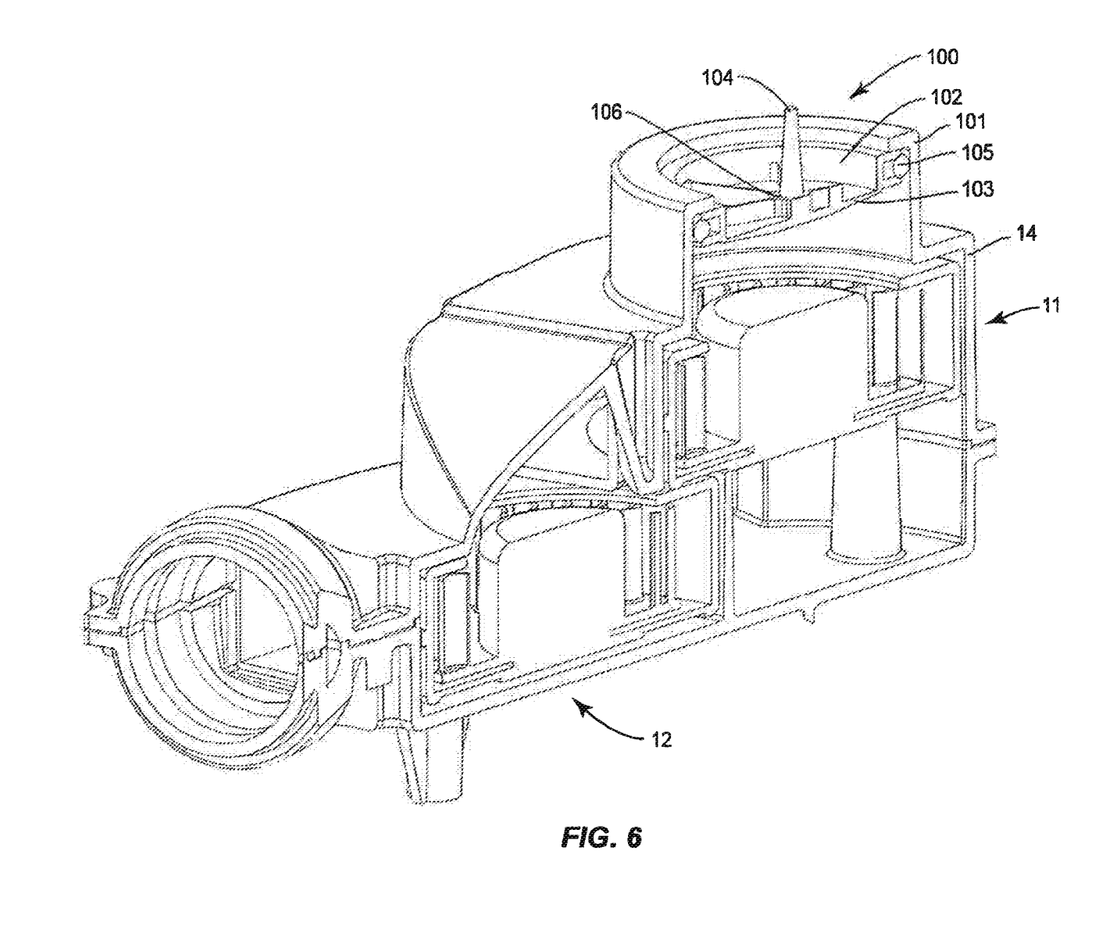
FIG. 6 is a cut-away perspective view of the air intake assembly according to the present disclosure connected to the dual blower system.
Figure 7:
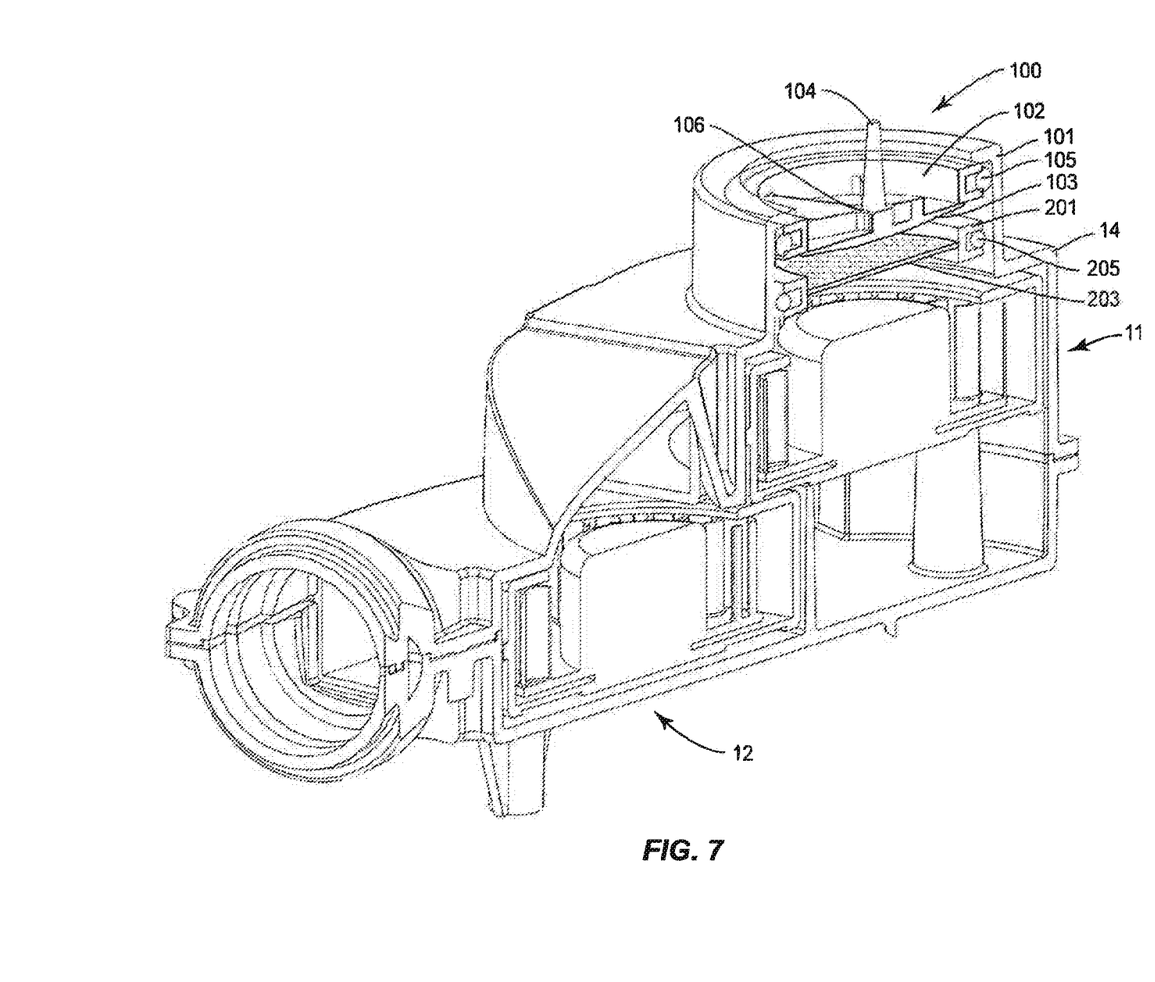
FIG. 7 is a cut-away perspective view of the air intake assembly including a filter component according to the present disclosure connected to the dual blower system.
Figure 8A:
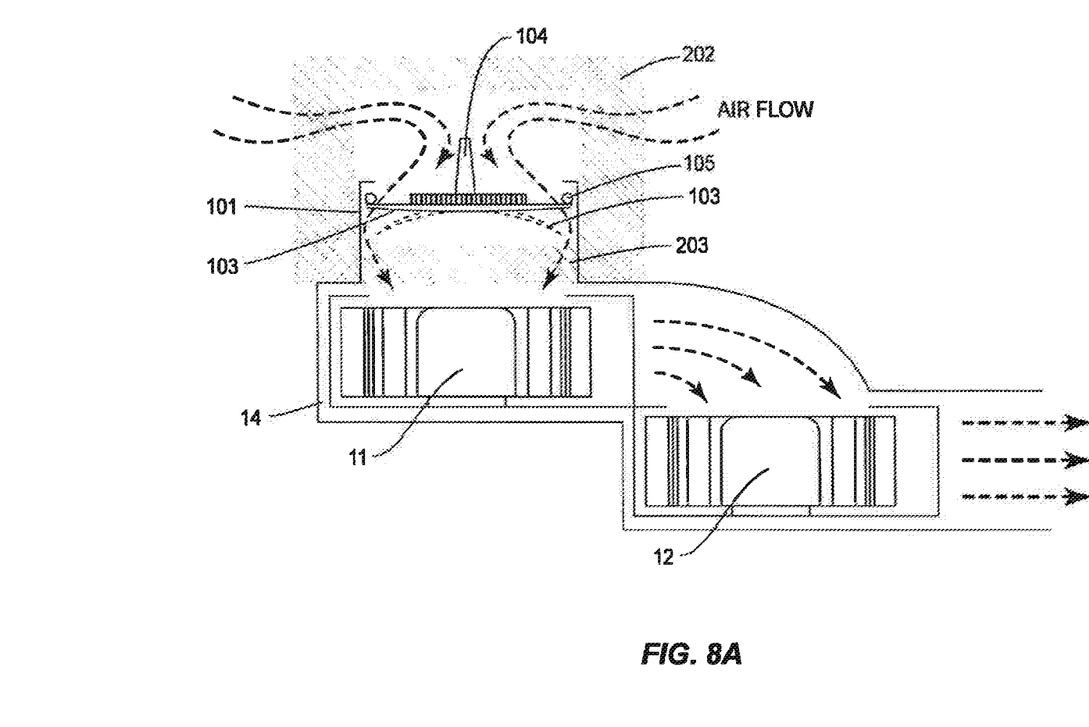
FIGS. 8A and 8B are cut-away side plan views of the air intake assembly including multiple filter components according to various embodiments of the present disclosure connected to the dual blower system.
Figure 8B:
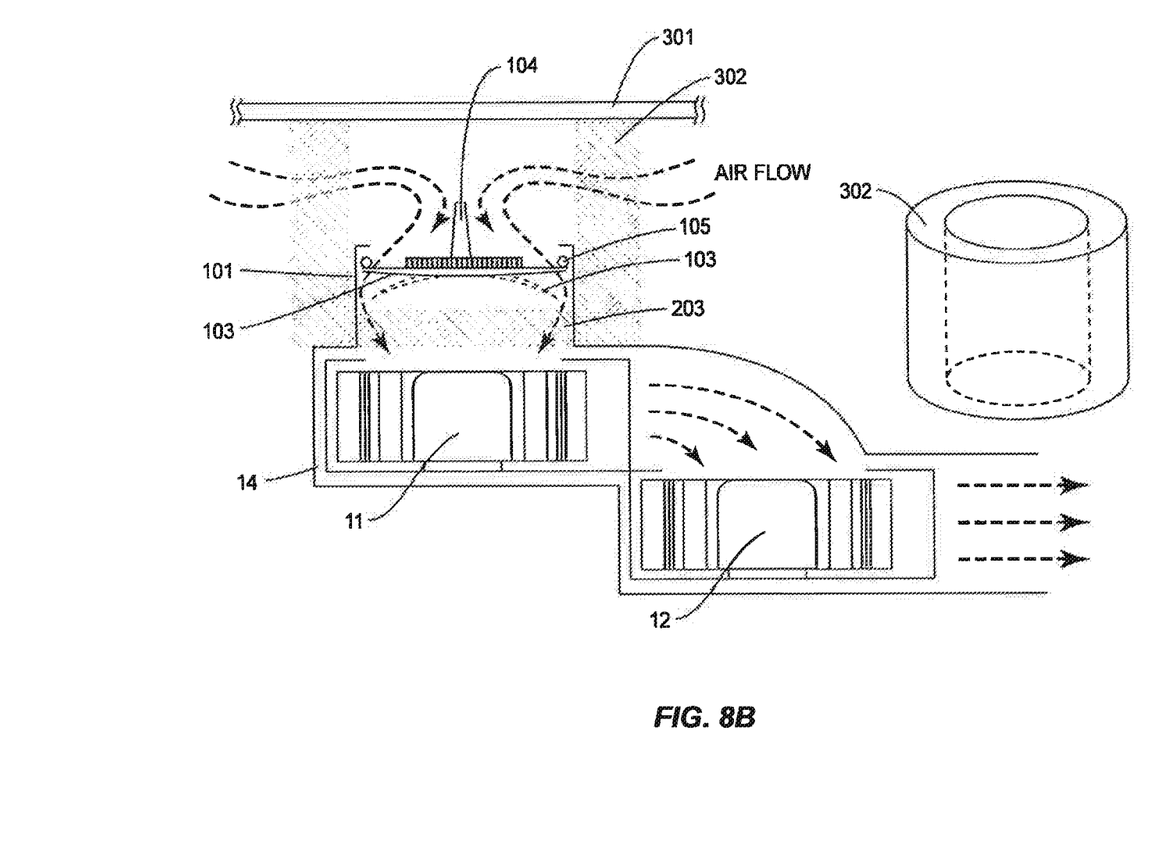

FIGS. 6-8 are cut-away illustrations of dual centrifugal blower system 10 with various embodiments of air intake assemble 100 attached to axial inlet 15.

FIG. 6 illustrates a perspective view of an embodiment of air intake assembly 100 with the check valve assembly attached to blower system 10. Check valve assembly includes frame 102, radial arms 106 flapper 103 and flapper connecting post 104 connected to flapper 103. Radial arms 106 are connected at one end to frame 102 and meet in the center to form a receptacle to accept flapper connecting post 104. In the embodiment shown in FIG. 6, frame 102 is held in place via compression using O-ring 105. The check valve assembly prevents zero flow conditions from getting back flow from fans and other process air, which at high temperatures can damage the solid oxide fuel cell (SOFC) and catalysts by oxidation. Although the check valve assembly is described and illustrated as a flapper type check valve, other check valve assemblies are contemplated, for example, a ball check valve, a spring and piston check valve, etc.

Flapper 103 can be a soft elastomer that induces very little pressure drop to open and uses the slight inherent stiffness and spring constant of the material to close and seal. The movement is illustrated in FIG. 8 wherein in its closed position, flapper 103 is shown as a solid line, and in its open position, flapper 103 is shown as a dashed line. Flapper 103 opens when blowers are engaged and pull air in through axial inlet 15. When blowers are off or if the back pressure of the system causes air to flow in the direction opposite the arrows in FIGS. 8A and 8B, flapper 103 closes to prevent the flow of air.

FIG. 7 illustrates a perspective view of an embodiment of air intake assembly 100 with the check valve assembly and a filter assembly or filtration unit attached to blower system 10. The check valve assembly is the same as illustrated in FIG. 6 and described above. The filter assembly includes filter frame 201, filter 203, and O-ring 205. Filter 203 is held by filter frame 201. In the embodiment shown in FIG. 7, filter frame 201 is held in place via compression using O-ring 205. Filtration of the incoming air by the filter assembly after the check valve assembly can be used to filter particulates, volatile compounds, sulfur compounds, hydrocarbons, etc., desiccants to reduce moisture, active filtration media to remove air contaminants, etc. Filter 203 can be reticulated foam (low pressure drop) of some kind and potentially doped with specific materials to perform the tasks enumerated above, e.g. as a sulfur trap. The particle size that is filtered can range from 1-100 microns or beyond.

Although filter assembly is described having filter frame 201, filter 203, and O-ring 205, other embodiments are contemplated. For example, a single form-fitted foam can be fitted into place without the need for filter frame 201 and O-ring 205; FIGS. 8A and 8B illustrate these configurations.

FIGS. 8A and 8B illustrate perspective views of embodiments of air intake assembly 100 with the check valve assembly and multiple filter assemblies attached to blower system 10. Filtration of the incoming air before the check valve can be used to filter particulates, volatile compounds, and/or moisture.

In the embodiment of FIG. 8A, an outer filter 202 is attached over air intake assembly 100. Outer filter 202 is tubular in shape with the filter material extending across the upper end; the bottom end is open and sized to receive air intake assembly 100. When outer filter 202 is fitted onto air intake casing 101, air can flow through the top and partially along the sides of outer filter 202.

In the embodiment of FIG. 8B, outer filter 302 is attached over air intake assembly 100 in a fashion similar to that of FIG. 8A. Outer filter 302 is also tubular in shape but in this embodiment both the upper and lower ends are open. When outer filter 302 is fitted onto air intake casing 101, and positioned in an outer casing of a unit, for example a fuel cell, the inner surface of the casing 301 can be used to seal the upper open end of outer filter 302. Air can then flow only through and partially along the sides of outer filter 302.

It will, of course, be recognized that the invention is not limited to blower units possessing the forgoing characteristics but can utilize any centrifugal blower unit having lesser or greater dimensions, voltage and power requirements, impeller rpm, gas pressure and gas flow capabilities, etc.

Figure 9:
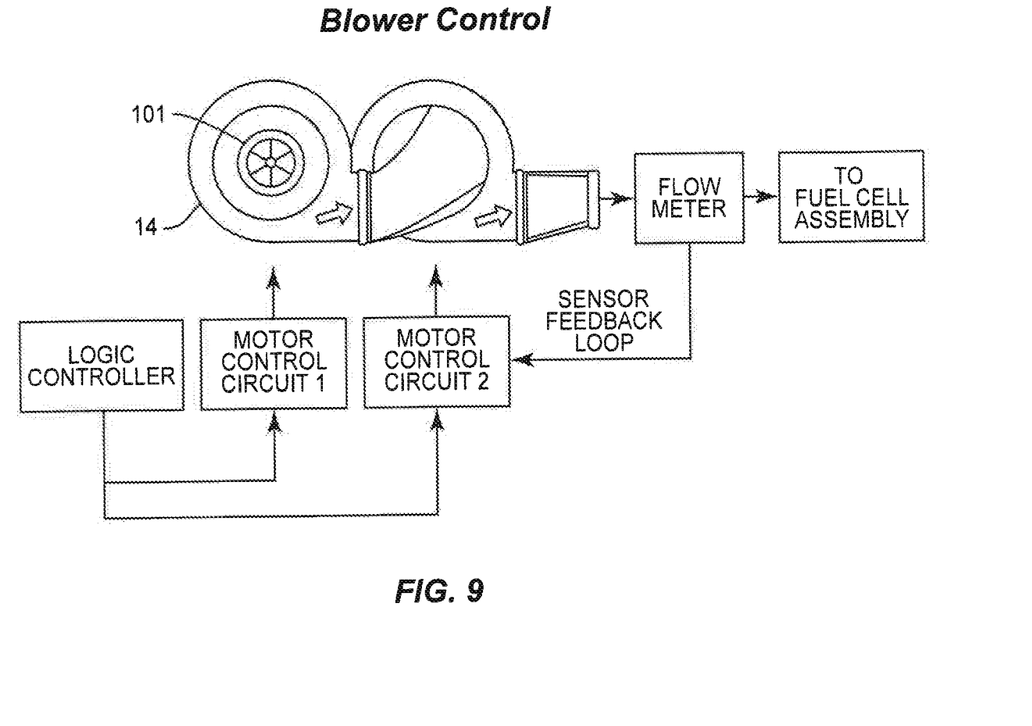
FIG. 9 is a block diagram of a control system of an air intake assembly according to the present disclosure for a dual blower system in accordance with the invention.

FIG. 9 illustrates a control system of a centrifugal blower system including an air intake assembly of the invention and a flow chart of its control logic. As those skilled in the art will recognize, these control operations can be carried out by a suitably programmed processor or controller.

In addition to the individual control of the blower units, the logic controller can utilize inputs from the flow meter to monitor the components of the air intake assembly. For example, a very low flow exiting the radial outlet of the blower as measured by the flow meter can indicate one or more of the filter assemblies are preventing air flow therethrough. Controller can then output an alarm to indicate the low flow condition, or in turn begin an emergency shutdown procedure for the fuel cell to prevent damage thereof.

The air intake assembly connected to the centrifugal blower system of this invention can manage gas flow requirements for a variety of applications. FIGS. 10A, 10B, 11A and 11B illustrate the use of the air intake assembly of the blower system of the invention to provide and mediate gas flows in an SOFC assembly of the tubular type (FIGS. 10A and 10B) and planar type (FIGS. 11A and 11B).

Figure 10A:
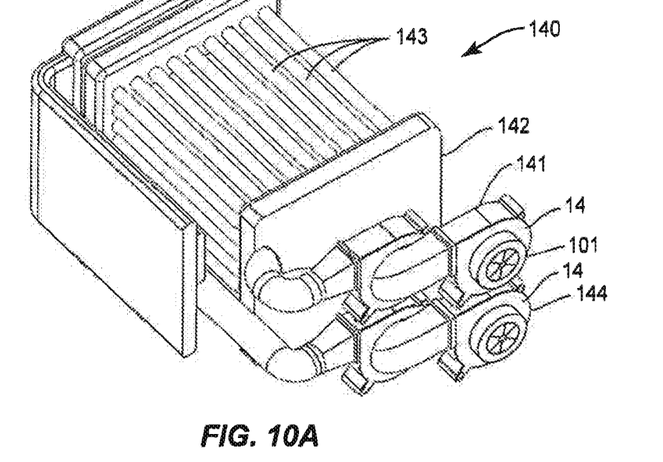
FIGS. 10A and 10B illustrate, respectively, perspective and plan views of a tubular SOFC assembly possessing separate dual blower systems having an air intake assembly according to the present disclosure of the invention for providing, respectively, air and fuel flow to the assembly.
Figures 10B, 10C:
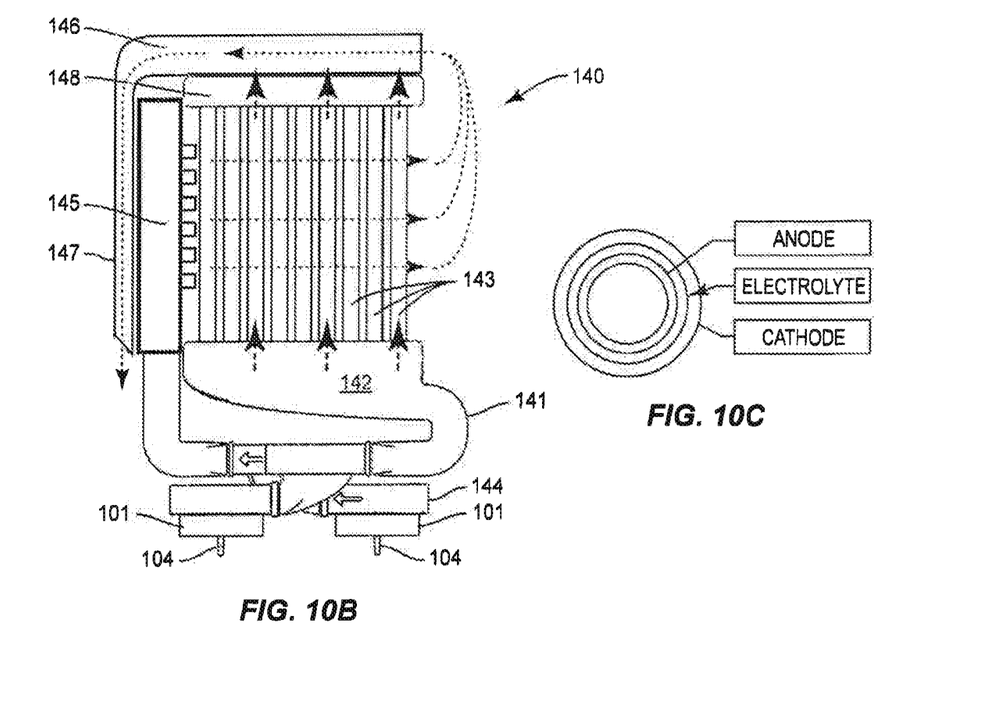
FIG. 10C is a diagrammatic illustration of a cross section of an individual tubular fuel cell in the tubular SOFC assembly of FIGS. 10A and 10B.
Figure 11A:
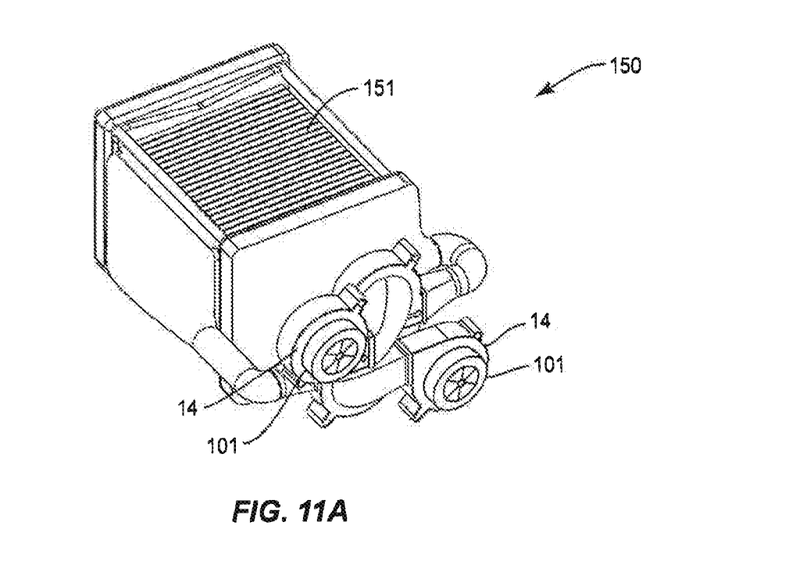
Figures 11B, 11C:
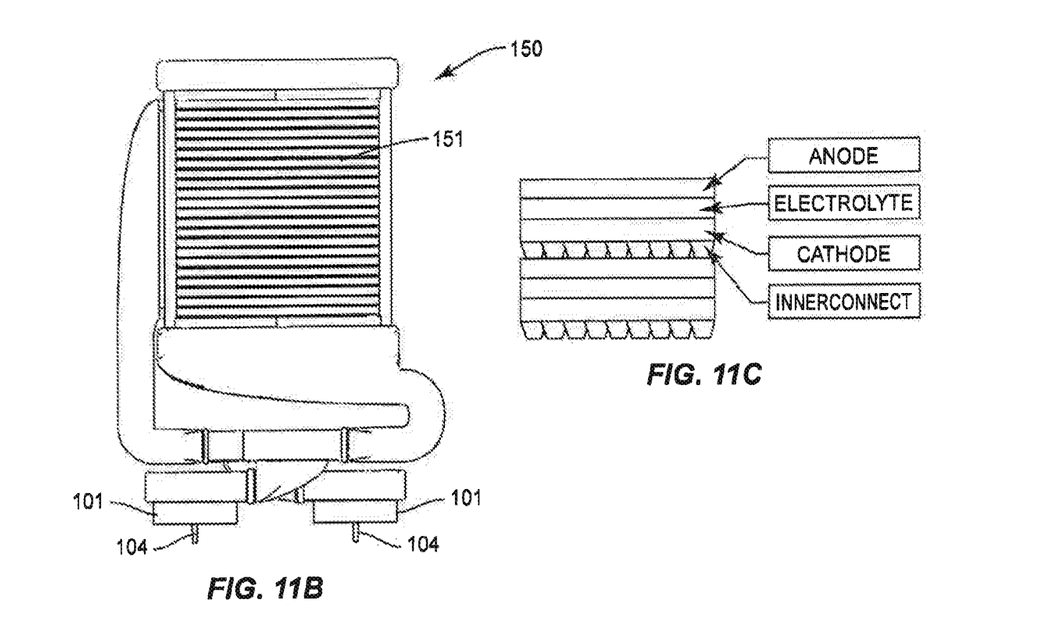

In tubular SOFC assembly, or stack, 140 of FIGS. 10A and 10B, first blower system and air intake assembly 141 provides a gaseous fuel, e.g., hydrogen, to manifold 142 for distribution to the interior array 143 of tubular SOFC elements. Each tube in array 143 can be of known or conventional construction and, as shown in FIG. 10C, possesses an innermost fuel-contacting anode layer, intermediate electrolyte layer and outer cathode layer. Second blower system and air intake assembly 144 distributes air, initially at ambient temperature, to manifold 145 from which it is released to provide a source of oxygen for the cathode component of each tubular SOFC element. The air entering manifold 145 gains heat from the hot combustion gases exiting tail burner 146 into heat exchanger 147. The dotted lines show the flow path of the heated air existing the outlets of manifold 145, passing through the SOFC array 143 and into tail burner 146 where it provides oxygen to support combustion of unspent fuel present in the exhaust gas emerging from the tubular SOFC elements into exhaust manifold 148 and from there into the tail burner. Finally, the hot combustion gases enter heat exchanger 147 where they serve to preheat incoming air provided by first blower system and air intake assembly 141 as previously indicated. Should back pressure initiate causing ambient air to begin to enter the system back through the tail burner and heat exchanger 147, check valve will close, thus preventing the ambient air from propagating further into the system.

The construction and operation of the planar SOFC assembly shown in FIGS. 11A and 11B is much the same as that described above for the tubular SOFC assembly of FIGS. 10A and 10B the principal difference being the use of planar SOFC elements. As shown in FIG. 11C, each planar SOFC element in array 151 includes anode, electrolyte, cathode and interconnect components.

Although the invention has been described in detail for the purpose of illustration, it is understood that such detail is solely for that purpose, and variations can be made therein by those skilled in the art without departing from the spirit and scope of the invention which is defined in the claims.

What is claimed is:

1. A centrifugal blower air intake apparatus incorporated upstream of a solid oxide fuel cell in a solid oxide fuel cell assembly, the centrifugal blower air intake apparatus comprising:
   a blower unit, comprising:
   a blower casing having an axial inlet and a radial outlet;
   an impeller disposed within the casing for drawing a gaseous medium at a first pressure into the axial inlet and expelling gaseous medium at a second higher pressure through the radial outlet; and
   a motor for driving the impeller; and
   an air intake assembly, comprising:
   an air intake assembly casing having an air inlet and an air outlet, the air outlet connected to the axial inlet of the blower casing of the blower unit; and
   a check valve mounted within the casing positioned to permit air flow from the air inlet through to the air outlet to prevent air flow from the air outlet through to the air inlet, and
   wherein the check valve comprises a flapper attached to the inlet of the air intake assembly casing, and
   wherein the flapper opens when blower is engaged and pull air in through axial inlet, the flapper closes when blowers are off or a back pressure of the system causes air to flow in the direction opposite a current air flow; and
   an outer filter attached over air intake assembly and fitting onto air intake assembly casing for air to flow through the top and partially along the sides of the outer filter.

2. The centrifugal blower air intake apparatus of claim 1, wherein the air intake assembly further comprises at least one air filtration unit positioned at the air inlet.

3. The centrifugal blower air intake apparatus of claim 2, wherein the air filtration unit includes at least one of a sulfur trap or a desiccant.

4. The centrifugal blower air intake apparatus of claim 1, wherein the air intake assembly casing and the blower casing are at least one of monolithically formed or separable from each other.

5. A centrifugal blower air intake apparatus incorporated upstream of a solid oxide fuel cell in a solid oxide fuel cell assembly, the centrifugal blower system comprising:
   a series of blower units, each blower unit in the series comprising a blower unit casing having an axial inlet and a radial outlet, an impeller disposed within the blower unit casing for drawing a gaseous medium at a first pressure into the axial inlet and expelling gaseous medium at a second higher pressure through the radial outlet, and a motor for driving the impeller;
   a duct connecting the radial outlet of at least one blower unit in the series of blower units with the axial inlet of at least one other blower unit in the series of blower units; and wherein the centrifugal blower system further comprises
   an air intake assembly, comprising an air intake assembly casing having an air inlet and an air outlet, the air outlet connected to the axial inlet of the blower unit casing of a first blower unit of the series of blower units, and a check valve mounted within the air intake assembly casing positioned to permit air flow from the air inlet through to the air outlet and prevent air flow from the air outlet through to the air inlet;

wherein the check valve comprises a flapper attached to the inlet of the air intake assembly casing, and wherein the flapper opens when blower is engaged and pull air in through axial inlet, the flapper closes when blowers are off or a back pressure of the system causes air to flow in the direction opposite a current air flow; and an outer filter attached over air intake assembly and fitting onto air intake assembly casing for air to flow through the top and partially along the sides of the outer filter.

6. The centrifugal blower system of claim 5, wherein the air intake assembly further comprises at least one air filtration unit positioned at the air inlet.

7. The centrifugal blower system of claim 6, wherein the air filtration unit includes at least one of a sulfur trap or a desiccant.

8. The centrifugal blower system of claim 5, wherein the air intake assembly casing and the blower casing are at least one of monolithically formed or separable from each other.

9. An air intake assembly for a centrifugal blower incorporated upstream of a solid oxide fuel cell in a solid oxide fuel cell assembly, the centrifugal blower having a casing having an axial inlet and a radial outlet, an impeller disposed within the casing for drawing a gaseous medium at a first pressure into the axial inlet and expelling gaseous medium at a second higher pressure through the radial outlet, and a motor for driving the impeller, comprising:

an air intake assembly casing having an air inlet and an air outlet, the air outlet connectable to the axial inlet of the blower casing of the centrifugal blower; and a check valve mounted within the air intake assembly casing positioned to permit air flow from the air inlet through the air intake assembly casing to the air outlet and prevent air flow from the air outlet through the air intake assembly casing to the air inlet, and wherein the check valve comprises a flapper attached to the inlet of the air intake assembly casing, and wherein the flapper opens when blower is engaged and pull air in through axial inlet, the flapper closes when blowers are off or a back pressure of the system causes air to flow in the direction opposite a current air flow, an outer filter attached over air intake assembly and fitting onto air intake assembly casing for air to flow through the top and partially along the sides of the outer filter.

10. The air intake assembly for a centrifugal blower of claim 9, wherein the air intake assembly further comprises at least one air filtration unit positioned at the air inlet.

11. The air intake assembly for a centrifugal blower of claim 10, wherein the air filtration unit includes at least one of a sulfur trap or a desiccant.

12. The air intake assembly for a centrifugal blower of claim 9, wherein the air intake assembly casing and the blower casing are at least one of monolithically formed or separable from each other.

\* \* \* \* \*